UNITED STATES PATENT OFFICE.

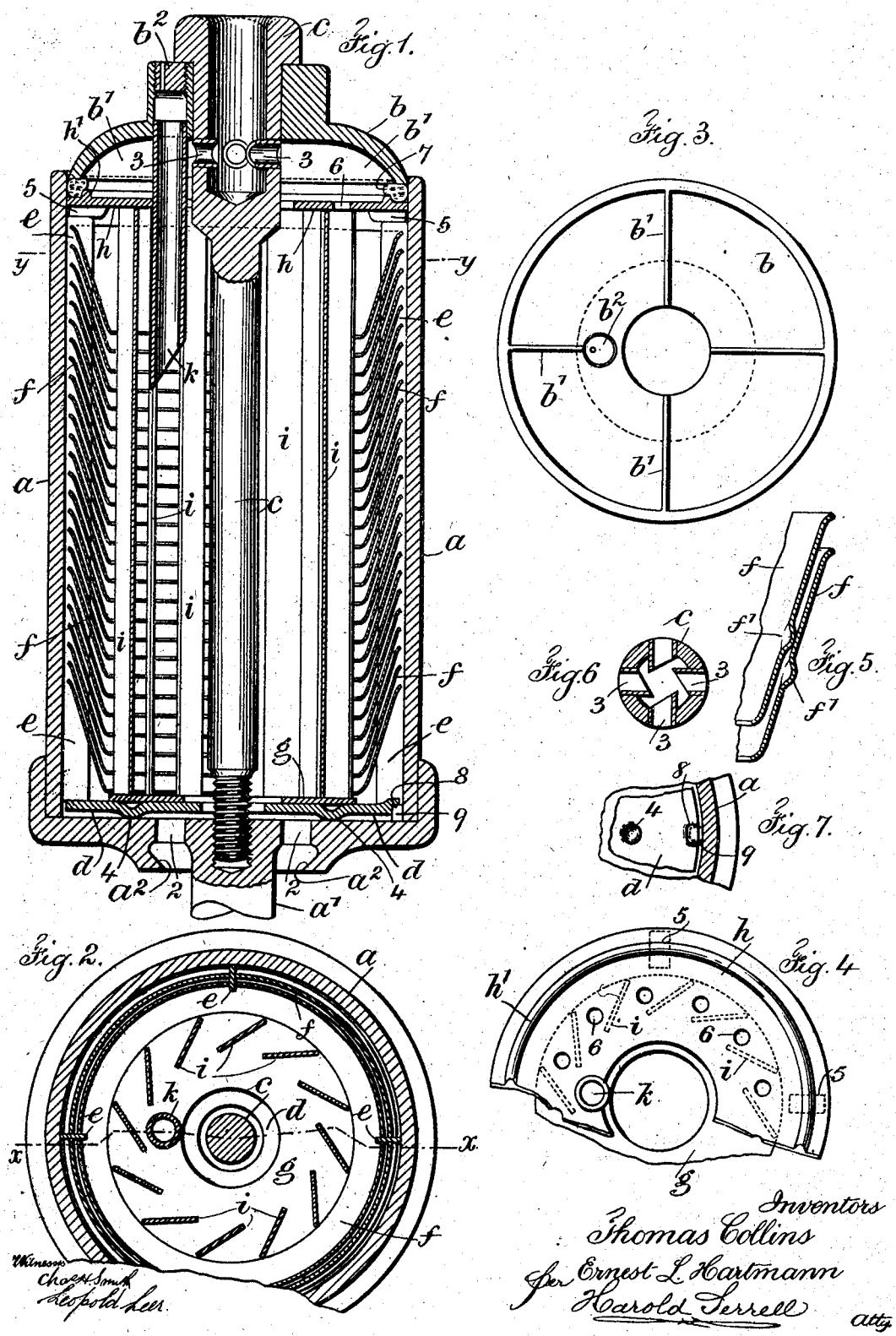

THOMAS COLLINS AND ERNEST LOUIS HARTMANN, OF BAINBRIDGE, NEW YORK, ASSIGNORS TO AMERICAN SEPARATOR COMPANY, OF BAINBRIDGE, NEW YORK, A CORPORATION OF NEW YORK.

CENTRIFUGAL LIQUID-SEPARATOR.

No. 796,189.     Specification of Letters Patent.     Patented Aug. 1, 1905.

Application filed February 27, 1905. Serial No. 247,435.

*To all whom it may concern:*

Be it known that we, THOMAS COLLINS and ERNEST LOUIS HARTMANN, citizens of the United States, residing at Bainbridge, in the county of Chenango and State of New York, have invented an Improvement in Centrifugal Liquid-Separators, of which the following is a specification.

Our invention relates to improvements in centrifugal liquid-separators, with the object of increasing the amount of liquid that can be put through the machine and separated into its constituents in a given period of time in consequence of certain internal improvements.

We provide a liner composed of a series of superimposed or nested annulus plates separated from one another a predetermined distance by suitable means and connected together and supported by a disk base and vertical radial bars. In connection with this liner we employ an inner member having a series of equidistant-spaced-apart substantially vertical blades which in transverse section obliquely cross radial lines with their ends connected to and supported by annulus disks. The lower of said disks sets within the liner member, and the upper of said disks is of greater diameter and extends over the liner and fits snugly within the bowl and at its edge supports a gasket upon which the cover bears within the upper open end of the bowl. The details of these and other features of improvment are hereinafter more particularly set forth.

In the drawings, Figure 1 is a vertical section and partial elevation representing the device of our invention, taken on the dotted line $x\,x$ of Fig. 2. Fig. 2 is a sectional plan of the parts shown in Fig. 1 on the dotted line $y\,y$, Fig. 1. Fig. 3 is an inverted plan of the cover. Fig. 4 is a broken plan above the top disk of the inner member. Fig. 5 is a vertical section of enlarged size through two of the superimposed or nested annulus plates, showing the means of separation. Fig. 6 is a cross-section through the apertures which permit the milk or other liquid to be discharged into the separator; and Fig. 7 is a sectional plan at the lower disk of the liner, showing the locking connection between the liner and the bowl.

The bowl $a$ preferably comprises a cylindrical portion and base and a spindle $a'$, by which the bowl is revolved at a high speed. In the base of the bowl are ducts 2 of any desired number, and the base of the bowl is finished with a flanged delivery edge $a^2$ below said ducts, drawn toward the axial center to an edge, the diameter of which is within the extreme diameter of the ducts 2. A cover $b$ is provided for the bowl having a central aperture and preferably made with radial blades $b'$ on the under side of the arched cover. We have shown and prefer to employ four of these blades $b'$ and, further, to increase the thickness of the cover near the central aperture, at the upper end of which is an adjustable plug $b^2$ for the cream-discharge, and this plug can be turned so as to bring the aperture therein either nearer to or farther from the axial center of the centrifugal separator, so as to regulate the amount of the cream discharged, and consequently the consistency thereof.

We provide a bolt $c$, which passes down through the aperture of the cover, and at its lower end it is provided with a screw-thread engaging an interiorly-threaded opening at the upper end of the spindle $a'$. The upper end of the bolt $c$ is tubular and formed as a nut to overlap the upper end of the cover, the said bolt when positioned holding the cover down in place to the bowl, with the lower edge of the cover within the walls of the bowl slightly below the upper edge thereof. The upper part of the bolt $c$ near the lower end of the tubular portion is provided with openings in which are tube-sections 3 for the discharge of the milk or other liquid admitted into the tubular upper end of the bolt, passing the same into the centrifugal separator. The ends of the tube-sections within the tubular part of the bolt are formed obliquely, so as to give direction to the inflowing liquid.

The liner, fitting snugly down into the bowl, comprises a disk base $d$, several vertical radial bars $e$, four of which are shown in the drawings, and a series of superimposed or nested annulus plates $f$, set obliquely to vertical lines, or, in other words, each formed as conic sections. The lower ends of the vertical bars $e$ are secured to the disk base $d$, and when the plates $f$ in their superimposed or nested form are connected to the said vertical bars a very rigid structure is formed. Each of these plates $f$ is preferably provided with a series of separating projections $f'$, as shown particularly in Fig. 5, the outer surfaces of which come against the upper surfaces of the next lower annulus plate, and these plates are notched at the places where they are connected to the vertical radial bars $e$, the union being thoroughly soldered, so as to produce as smooth contacting surfaces as possible.

The apertured disk base $d$ is preferably provided with a number of projections 4, which raise and support the same slightly above the bottom of the bowl. The diameter of the base $d$ is slightly less than the interior diameter of the bowl; but the diameter over the vertical bars $e$ is the same as the inner diameter of the bowl, consequently forming a contact with the inner surface of the bowl, so as to make a snug fitting. Furthermore, the edge of this disk base $d$ is preferably provided with a recess 8 from the under surface and the bottom of the bowl with a lug 9, adapted to enter the recess, so that when the liner is in position it is thereby compelled to turn with the bowl in its rotation.

The inner member fitting within the liner comprises an annulus disk $g$ at the bottom, an annulus disk $h$ at the top, and blades $i$, which in cross-section are set obliquely across radial lines from the center of the bowl. These blades $i$ are preferably placed vertical, although they may be placed, if desired, at an inclination, the cross-section remaining the same. While the annulus disk $g$ at the bottom of this inner member is freely received within the annulus plates $f$, the disk $h$ is of a diameter agreeing with the inner diameter of the bowl. Consequently it extends over the upper ends of the vertical bars $e$ and on the under surface is preferably provided with lugs 5, which rest upon the upper ends of the bars $e$ and raise the disk $h$ an appreciable distance above the same and above the upper edge of the uppermost annulus plate $f$. This upper annulus plate $h$ is provided with a series of perforations 6, preferably spaced apart, so that there is one between the respective blades $i$, the said perforations 6 being preferably arranged on an arc which advantageously intersects the blades $i$.

The disk $h$ is preferably provided with a rib $h'$ near its circumference, around which extends a gasket 7, the lower edge of the cover $b$ resting upon the gasket with sufficient force by virtue of the action of the bolt $c$, so as to form a completely liquid-tight closure. A tube $k$, vertically disposed, passes through the annulus disk $h$ and is secured thereto and rises above the same and enters the lower end of the cover-aperture containing the adjustable plug $b^2$. This is the cream-discharge tube, and the lower end thereof is tapered with the lowest portion at the greatest distance from the axial center of the separator, the inclination being about sixty degrees to the vertical. When the cover $b$ is held in place by the bolt $c$, it is impossible for the inner member to move.

In the operation of the device the milk or other liquid to be separated is delivered into the tubular upper end of the bolt $c$ and is discharged through the tubes 3 onto the upper surface of the disk $h$, direction being imparted thereto and the same being as equally distributed as possible by the radial blades $b'$ on the under side of the cover. From the top of the disk $h$ the liquid passes through the perforations 6 onto the blades $i$, and from the blades the same is thrown outward onto the inner surfaces of the annulus plates $f$, the same passing by virtue of the vertical motion up the said annulus plates $f$, the blue or skim milk being delivered from the upper outer edge of the said annulus plates $f$ onto the inner wall of the bowl and the cream or constituent of lightest specific gravity turning the upper edge and passing down the under side of the said annulus plates $f$ toward the lower inner edge, from which the same is delivered toward the center of the bowl and finds its way to and up through the cream-discharge tube $k$ and out of the aperture in the plug $b^2$, where the same is caught by any suitable receiving device and conveyed away. The blue or skim milk follows down the inner surface of the bowl, passes below the disk-base $d$ to and through the ducts 2, and is delivered off the edge of the flange $d^2$ into a suitable receptacle to be conveyed away.

A function of the blades $i$ and the annulus plates $f$ is to retard the progress of the liquid in its descent from the top to the bottom of the separator-bowl, so as to effect the most perfect separation of the lighter constituents of the liquid from the heavier constituents, the lighter passing off from the top of the bowl and the heavier from the bottom. Furthermore, the blades $i$ make possible a uniform feed of milk around the bowl and act to at once separate the cream most easily separated from the milk and provide easy access of the cream to the central portion of the bowl, leaving that portion of the milk containing smaller and fewer fat globules to be operated on by the outer series of liner-plates.

We claim as our invention—

1. In a centrifugal liquid-separator, the combination with an outer liner member, of an inner member comprising a series of blades which in cross-section obliquely cross radial lines, and annulus disks at the respective ends thereof.

2. In a centrifugal liquid-separator, the combination with an outer liner member, of an inner member comprising a series of vertical blades, which in cross-section obliquely cross radial lines, and annulus disks at the respective ends thereof, the lower disk setting within the liner and the upper disk extending over and resting upon the same.

3. In a centrifugal liquid-separator, the combination with an outer liner member, of an inner member comprising a series of equidistant-spaced-apart vertical blades which in cross-section obliquely cross radial lines, annulus disks at the respective ends thereof, the lower disk setting within the liner and the upper disk extending over and resting upon the same, and a discharge-tube secured to the upper disk, rising above the same and extending down below the same toward the center of the inner member.

4. In a centrifugal liquid-separator, a liner comprising a series of nested annulus plates separated from one another a predetermined distance, a series of vertical radial bars connected to and for supporting said annulus plates, an apertured disk-base to which said vertical bars are secured, said disk-base being provided with projections 4 from the under surface thereof adapted to support the liner above the interior bottom surface of the bowl.

5. In a centrifugal liquid-separator, the combination with a liner, of an inner member comprising a series of equidistant-spaced-apart blades $i$, which in cross-section obliquely cross radial lines, an annulus disk $g$ connected to the lower ends of said blades and adapted to fit into the liner, an annulus disk $h$ secured to the upper ends of said blades and adapted to extend over the full width of the liner, said disk $h$ having apertures 6 therein located between the respective upper ends of the blades $i$ for conveying the milk or other liquid from the upper side of the disk $h$ to the surfaces of the blades $i$.

6. In a centrifugal liquid-separator, the combination with a liner, of an inner member comprising a series of equidistant-spaced-apart blades $i$, which in cross-section obliquely cross radial lines, an annulus disk $g$ connected to the lower ends of said blades and adapted to fit into the liner, an annulus disk $h$ secured to the upper ends of said blades and adapted to extend over the full width of the liner, said disk $h$ having apertures 6 therein located between the respective upper ends of the blades $i$ for conveying the milk or other liquid from the upper side of the disk $h$ to the surfaces of the blades $i$, and a tube $k$ vertically disposed and secured to the disk $h$ and rising above and extending below the same.

7. In a centrifugal liquid-separator, the combination with the bowl, an outer liner member fitting within the same, and a cover, of an inner member having an upper disk fitting within the bowl and extending over the liner, and a rib near the periphery thereof, a gasket resting upon the upper disk outside of the rib and coming between the same and the edge of the cover, the edge of the cover setting down within the upper open end of the bowl.

8. In a centrifugal liquid-separator, the combination with the inner member having an upper annulus disk extending across within the bowl and provided with spaced-apart apertures 6, of an arched cover having a vertically-disposed aperture, and radial blades $b'$ extending down from the arched cover to the level of the periphery thereof for directing the inflowing milk or other liquid and distributing the same evenly over the surface of the upper annulus disk.

9. In a centrifugal liquid-separator, the combination with the bowl and a centrally-apertured cover fitting the same, of a bolt $c$ extending down through the cover and connecting with the base of the bowl, the upper end of the bolt being made tubular with lateral apertures, and tubes 3 set in said apertures and having obliquely-formed edges regularly disposed around the tubular end of the bolt, substantially as set forth.

10. In a centrifugal liquid-separator, a bowl having an inwardly-extending flanged delivery edge $a^2$ of circular form below the main portion of the bowl, the base of the bowl having ducts 2, the diameter of the delivery edge being within the extreme diameter of the ducts.

11. In a centrifugal liquid-separator, the combination with the bowl and a lug 9 formed therewith and in the lower corner thereof, of a liner adapted to fit down into the bowl and having an apertured base-disk with a covered edge recess adapted to engage the said lug to insure the liner turning with the bowl.

Signed by us this 21st day of February, 1905.

THOS. COLLINS.
ERNEST LOUIS HARTMANN.

Witnesses:
  CORA S. BURDICK,
  EDSON C. BURDICK.